(12) United States Patent
Hamilton

(10) Patent No.: US 11,230,219 B2
(45) Date of Patent: Jan. 25, 2022

(54) ATTACHMENT FOR FACILITATING SECURING OF A LOAD WITH A STRAP, ROPE OR THE LIKE

(71) Applicant: LOOPER STRAP WEIGHTS PTY LTD (ACN 625 200 464), Ballarat (AU)

(72) Inventor: Ian Hamilton, Victoria (AU)

(73) Assignee: LOOPER STRAP WEIGHTS PTY LTD, Victoria (AU)

( * ) Notice: Subject to any disclaimer, the term of this patent is extended or adjusted under 35 U.S.C. 154(b) by 0 days.

(21) Appl. No.: 15/767,978

(22) PCT Filed: Oct. 13, 2016

(86) PCT No.: PCT/AU2016/050963
§ 371 (c)(1),
(2) Date: Apr. 12, 2018

(87) PCT Pub. No.: WO2017/063043
PCT Pub. Date: Apr. 20, 2017

(65) Prior Publication Data
US 2018/0304798 A1 Oct. 25, 2018

(30) Foreign Application Priority Data
Oct. 13, 2015 (AU) .............................. 2015904159

(51) Int. Cl.
*B60P 7/08* (2006.01)
*B61D 45/00* (2006.01)

(52) U.S. Cl.
CPC .......... *B60P 7/0853* (2013.01); *B60P 7/0869* (2013.01); *B61D 45/001* (2013.01); *Y10T 24/47* (2015.01)

(58) Field of Classification Search
CPC ...... B60P 7/0853; B60P 7/0869; Y10T 24/47; Y10T 24/1379; Y10T 24/1397;
(Continued)

(56) References Cited

U.S. PATENT DOCUMENTS 2,379,676 A * 7/1945 Blackstone ............ A01K 93/00
43/44.88
4,389,805 A * 6/1983 Hargrave ............... A01K 95/00
43/43.14
(Continued)

FOREIGN PATENT DOCUMENTS

| CN | 102947520 | 2/2013 |
| KR | 101609352 | 4/2016 |

OTHER PUBLICATIONS

Yew-Seng How "International Search Report—PCT/AU2016/050963" Australian Patent Office; dated Nov. 28, 2016; pp. 1-4.
(Continued)

*Primary Examiner* — Robert Sandy
*Assistant Examiner* — Michael S Lee
(74) *Attorney, Agent, or Firm* — Nicholas J. Landau; Bradley Arant Boult Cummings LLP

(57) ABSTRACT

There is disclosed an attachment for facilitating positioning of a pliable or flexible line such that said line extends over at least one object, the attachment being removably attachable to a free end of said line and being able, when so attached, to be thrown so as to carry the end over the object(s) whereby said positioning is effected.

21 Claims, 13 Drawing Sheets

(58) Field of Classification Search
CPC . Y10T 24/39; Y10T 24/4773; Y10T 24/4501;
Y10T 24/3936; B63C 9/26; A01K 95/00;
A01K 95/02; A01K 95/005; A01K 93/00
See application file for complete search history.

(56) References Cited

U.S. PATENT DOCUMENTS

| | | | | |
|---|---|---|---|---|
| 4,706,594 | A * | 11/1987 | Burns | B63B 21/04 114/218 |
| 5,236,383 | A * | 8/1993 | Connelly | A63B 43/007 446/219 |
| 5,279,021 | A * | 1/1994 | Edgin | F16B 45/02 24/3.6 |
| 5,428,920 | A * | 7/1995 | Levin | A01K 93/00 43/44.89 |
| 6,053,156 | A * | 4/2000 | Boon | F41B 3/02 124/20.1 |
| 6,142,553 | A | 11/2000 | Bodecker | |
| 6,955,574 | B2 * | 10/2005 | Rogerson | B63B 21/22 441/3 |
| 8,950,107 | B1 * | 2/2015 | Rosenbloom | A01K 95/02 43/44.93 |
| 9,770,619 | B1 * | 9/2017 | Bullock | A63B 21/22 |
| 9,788,527 | B1 * | 10/2017 | Harrington | A01K 15/025 |
| 2005/0170718 | A1 | 8/2005 | Rogerson | |
| 2011/0225872 | A1 | 9/2011 | Farley et al. | |
| 2018/0283037 | A1 * | 10/2018 | McDonald | E04H 15/04 |

OTHER PUBLICATIONS

IHSA, Securing Loads [retrieved from the Internet on Nov. 25, 2016] <URL:https://web.archive.org/web/20140826015206/http://www.ihsa.ca/pdfs/safety tal ks/securing_loads.pdf> published on Aug. 26, 2014 as per Wayback Machine Whole document.
Amleo, High Ball Throw Weight Kit with Throw Line [retrieved from the Internet on Nov. 25, 2016] <URL:https://web.archive.org/web/20150927031441/http://www.amleo.com/high-ballthrow-weight-kit-with-throw-line/pNP-HBZ/> published on Sep. 27, 2015 as per Wayback Machine Whole document.
State Intellectual Property Office of the People's Republic of China "Notification of the First Office Action" dated May 22, 2020; pp. 1-5 and translation thereof.

* cited by examiner

— 1 —

ATTACHMENT FOR FACILITATING SECURING OF A LOAD WITH A STRAP, ROPE OR THE LIKE

CROSS-REFERENCE TO RELATED APPLICATIONS

This application is a national stage under 35 U.S.C. 371 of International Application No. PCT/AU2016/050963 having an international filing date of Oct. 13, 2016 (currently published). International Application No. PCT/AU2016/050963 cites the priority of AU 2015904159, filed Oct. 13, 2015 (lapsed).

FIELD OF THE INVENTION

The present invention relates to an attachment which can be coupled to a strap, rope or other pliable or flexible line which, when so coupled, functions as a weight and can be thrown over a load whereby the member is received over the load. The invention has particular, though by no means exclusive, application to securing of loads supported on vehicle trays and beds.

BACKGROUND

Securing of a load against a flat bed or tray floor of a vehicle typically involves tying the load down against the bed or floor using a pliable or flexible line, consisting of rope, strapping or the like. Generally speaking, the rope or strapping is positioned so as to extend across the tray or bed and over the load, and is tightly fastened at opposite sides of the tray or bed so as to secure the load. Positioning the rope or strapping over the load can be difficult, particularly where the load is bulky or tall.

SUMMARY OF THE INVENTION

According to a first aspect of the present invention, there is provided an attachment for facilitating positioning of a pliable or flexible line such that said line extends over at least one object, the attachment being removably attachable to a free end of said line and being able, when so attached, to be thrown so as to carry the end over the object(s) whereby said positioning is effected.

The attachment thus facilitates casting of the line.

Preferably, the attachment is configured such that when attached to the free end it assumes the configuration of a ball.

Preferably, the attachment comprises a body. Preferably, the body is generally spherical or ball-shaped. Preferably, the body is non-rigid, whereby it can deform when impacting with an object upon the positioning being effected. A likelihood of damage to the object from the impact can, in this way, be minimised or eliminated. Preferably, the body is resiliently deformable. In a preferred embodiment of the invention, the body is formed from an elastomer.

The attachment may be directly attachable to the end. The attachment may be sideways introduceable over the pliable or flexible line to be attachable to the end. Advantageously, the attachment can then be attached to the end without obstruction by a connector or fitting which is attached to a tip of that end. The attachment may be configured to bite or clamp the end whereby to be attached thereto.

Alternatively or additionally, the attachment may be directly attachable to a connector or fitting attached to the end. The connector or fitting may comprise, for example, an eye or a hook.

In a preferred embodiment of the invention, the attachment comprises a connector, locking mechanism or connecting mechanism arranged to engage the connector or fitting coupled to the end such that the attachment is attached to the line via the connector or fitting attached to the end.

In a preferred embodiment of the invention, the body is configured with a seat portion at a side thereof opposite said mechanism, the seat portion being receivable against a surface whereby the attachment is stably supported on the surface in a position such that the connector is substantially uppermost. Preferably, the seat portion comprises a flat surface region of the body.

In a preferred embodiment of the invention, the connecting mechanism or locking mechanism is connected to the body.

In a preferred embodiment of the invention, the connector, connecting mechanism or locking mechanism is countersunk in the body.

In a preferred embodiment of the invention, the connecting mechanism or locking mechanism is rotatable relative to the body such that the body can swivel relative to the fitting/connector or line when the attachment is attached to the line.

Preferably, the connector, connecting mechanism or locking mechanism is configured to engage a leading end of the connector or fitting attached to the end.

Preferably, said mechanism comprises a catch or latch mechanism.

Preferably, said mechanism comprises an actuator operable by finger or thumb to effect disengagement of the mechanism from said connector or fitting attached to the end.

In a preferred embodiment of the invention, the actuator is depressible to effect said disengagement. The actuator may be pivotable to effect the disengagement.

Preferably, the actuator comprises a button or lever.

Preferably, the connector, locking mechanism or connecting mechanism is snap-fit or snap-lock engageable with said connector or fitting attached automatically to the end such that the attachment is attached to the line via the connector or fitting attached to the end. Preferably, the attachment is configured such that the snap-fit/lock engagement can be effected by pushing (e.g. forwardly) the connector/fitting against the connector, locking mechanism or connecting mechanism.

Preferably, said mechanism comprises a rotary latch mechanism.

In a preferred embodiment of the invention, the body comprises opposing first and second portions which can be spaced or spread apart to permit the end or connector/fitting to be received by the body and brought together or adjacent each other to clasp or clamp the end or connector/fitting so received. Preferably, the body comprises first and second sections which are pivotably coupled and which define said first and second portions respectively. Preferably, the attachment comprises a hinge which pivotably interconnects the first and second sections. Preferably, the hinge comprises a butt hinge. Alternatively, the hinge may, for example, comprise a flexible hinge, such as a living hinge or a hinge which is defined by a section of strap which is secured to the first and second sections, e.g. against outer faces thereof via screws, and/or which may be inset.

The attachment may include means for locking the portions adjacent each other to effect the clamping/clasping of the end or connector/fitting by the body. Preferably, the locking means is arranged so as to be countersunk with respect to the body when in a locked condition. Preferably, the attachment then further includes means biasing the portions apart to permit the receipt of the end or connector/fitting by the body. In one embodiment of the invention, the attachment includes said hinge, and said hinge is sprung whereby the biasing means is defined. Preferably, the sprung hinge comprises a spring-loaded butt hinge.

The locking means may comprise an elongate fastener for releasably locking said portions adjacent each other, which fastener may be configured in the form of a pin. Preferably, the elongate fastener is configured to extend through the first section and into or through the second section to engage said sections and thus lock said portions adjacent each other. Preferably, the elongate fastener comprises an actuator at or adjacent a first end thereof and a lock at or adjacent a second end thereof and is configured such that, when the elongate fastener so extends, the elongate fastener engages the first section, the lock is located for engagement with the second section and actuator is operable to effect and/or discontinue said engagement. Preferably, the actuator is movable from a first position in which it maintains the lock in a locking condition to a second position in which allows the lock to assume a non-locking condition, and is biased to its first position. Preferably, the elongate fastener comprises a sleeve, the lock comprises locking elements received by the sleeve and positioned adjacent respective circumferentially spaced apart openings formed through a wall of the sleeve at or adjacent the second end, and the elongate fastener further comprises a shaft, received by the sleeve and coupled to or defining the actuator, the shaft being axially moveable, by operation of the actuator, between a first position in which it urges the elements radially outwardly such that portions thereof project from the wall to engage the second section when said elongate fastener so extends. In the first embodiment, the second section is preferably configured with a circumferentially extending formation arranged to be engaged by the projecting portions. Preferably, the formation comprises a radially inwardly opening circumferential groove or channel arranged to receive the projecting portions.

Preferably, the elongate fastener is formed with a retaining head at or adjacent the first end.

The body may be configured with a passage formed through the first section and into or through the second section, the passage being arranged to receive the fastener such that it so extends.

The body may be configured such that the first end of the elongate fastener is countersunk with respect thereto when the fastener so extends.

The body may be configured such that the second end of the elongate fastener is concealed when the fastener so extends.

The locking means may, alternatively, comprise a clasp. Preferably, the clasp is arranged so as to be countersunk with respect to the body when in a locked condition.

In a preferred embodiment of the invention, the attachment includes means biasing the portions adjacent each other so as to effect the clasping or clamping of the end or connector/fitting by said portions, and be configured such that the portions can be drawn apart, against the bias, to permit receipt of the end or connector/fitting by the body.

Preferably, either or each of said first and second portions is provided with an anti-slip area arranged to engage the free end biting and/or frictionally when the attachment is attached thereto. Preferably, said first and second portions are provided with formations which are formed to engage the free end bitingly and/or frictionally when the attachment is attached thereto. The formations may comprise interengageable serrations or corrugations, and/or be defined by a rough surface finish. The formations may, for example, be formed, such as by moulding, into the first and second portions, or defined by one or more elements attached to the portion(s).

Preferably, either or each of said first and second portions is provided with a section profiled complementarily to the connector/fitting such that the connector/fitting can be securely clasped or clamped by the first and second portions when the attachment is attached thereto. The or each profiled section may comprise, for example, a recess, such as a groove or channel, which may be v-shaped or semi-circular, to fit to a correspondingly shaped portion of the connector/fitting. Preferably, only one of said portions is provided with a said profiled section. Where both are provided with a said profiled section, preferably the profiled sections are arranged to be brought into alignment when said first and second portions are brought together or adjacent each other. The profiled section(s) may, for example, be formed, such as by moulding, into the portion(s), or defined by one or more elements attached to the portion(s).

According to a second aspect of the present invention, there is provided an assembly comprising an attachment as defined above and said line, wherein the attachment is directly attached to said free end or to a said fitting or connector which is attached to the end.

According to a third aspect of the present invention, there is provided a method of positioning a pliable or flexible line such that said line extends over at least one object, the method comprising attaching, to a section of said line or to a fitting or connector attached to the line, an attachment as defined above and then throwing the attachment such that it carries the section over the object(s), whereby said positioning is effected.

According to a fourth aspect of the present invention, there is provided a method of securing at least one object against a support, comprising:
  attaching, to a section of a pliable or flexible line or to a
    fitting or connector attached to the section, an attachment as defined above and then throwing the attachment such that it carries the section over the object(s), whereby the line extends over the object(s); and
  effecting tight anchorage of said line such that the or each
    object is secured against the support by said line.

In a preferred embodiment of the invention, said tight anchorage is effected by anchoring the line to said support.

The method may include removal of the attachment prior to the tight anchorage being effected.

Effecting the tight anchorage may comprise attaching the line to an anchor point—e.g. the support—via the fitting or connector.

Preferably, a load is defined by the object(s), and the support comprises a structure for holding or carrying the load. Preferably, the structure forms part of a vehicle. The structure may, for example, comprise a tray or bed of the vehicle.

Preferably, said section comprises said free end. In one embodiment of the invention, attaching the attachment to the section comprises sideways introduction of the attachment over the section. In this embodiment, said fitting or connector may be attached to the section.

The line may be configured in the form of a strip—e.g. it may comprise a belt or strap, which may be formed from webbing—and the attachment configured to be received against opposite faces of the strip. Alternatively, the line may comprise, for example, a rope.

According to a fifth aspect of the present invention, there is provided a method of casting a pliable or flexible line, the method comprising throwing an attachment as defined above, the attachment being attached a section of said line or to a fitting or connector attached to the line.

BRIEF DESCRIPTION OF THE DRAWINGS

The present invention will now be described, by way of non-limiting example only, with reference to the accompanying drawings, in which.

DETAILED DESCRIPTION OF THE PREFERRED EMBODIMENTS

Figure 1:
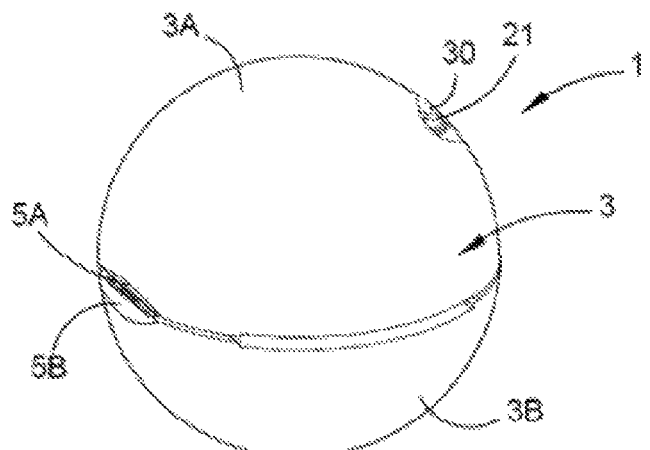
FIG. 1 is a rear perspective view of a weight attachment according to a first preferred embodiment of the invention in a closed condition.
Figure 2:
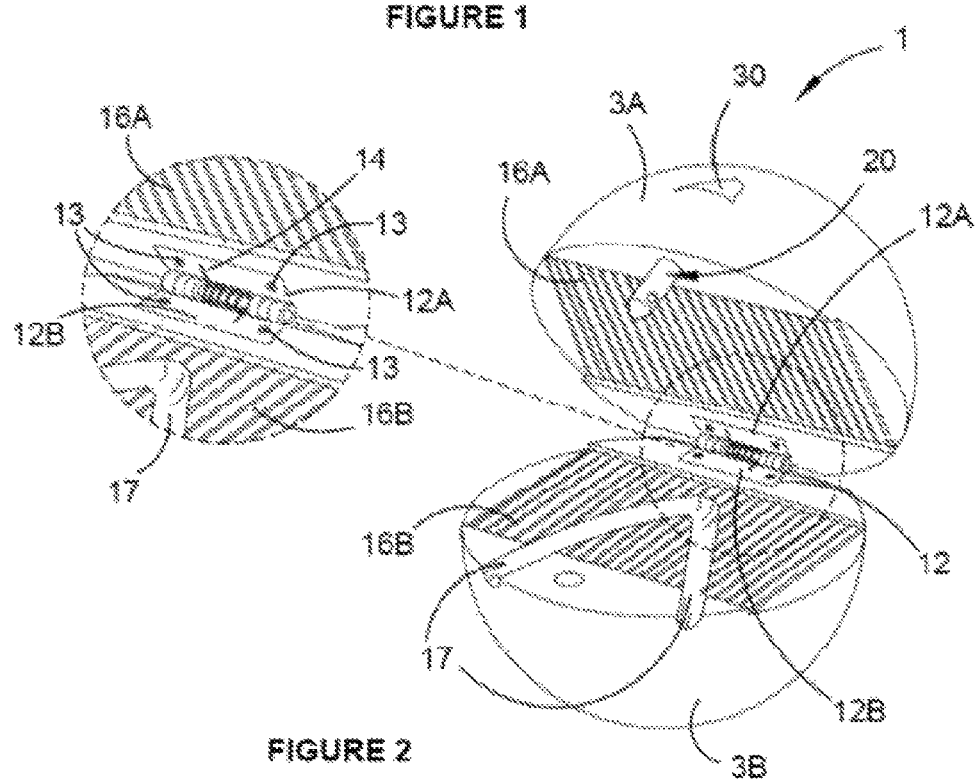
FIG. 2 is a front perspective view of the weight attachment of the first embodiment in an open condition.

A weight attachment 1 according to a first preferred embodiment of the invention, shown in a closed condition in FIG. 1 and an open condition in FIG. 2, comprises a generally spherical, semi-hardened rubber body 3 comprising opposed generally hemispherical first and second sections 3A, 3B. The attachment 1 further comprises a hinge 12 which is secured to opposed faces of the sections 3A, 3B, thereby pivotally interconnecting those sections such that they are pivotally moveable between the closed condition and the open condition. The hinge 12 is an inverted butt hinge, comprising pivotally interconnected plates 12A, 12B, which are received in recesses formed into the sections 3A, 3B respectively, so as to be countersunk, and which are secured to the sections 3A, 3B via screws. The hinge 12 is provided with a torsional spring 14 which acts to spread the plates 12A, 12B apart and thus exerts an opening bias on the sections 3A, 3B. Proximal ends of the sections 3A, 3B are formed with chamfers 5A, 5B respectively, which define a relief rearward of the hinge 12, permitting the attachment 1 to open, and which abut each other when the attachment 1 is fully open to preclude further opening.

Figure 3:
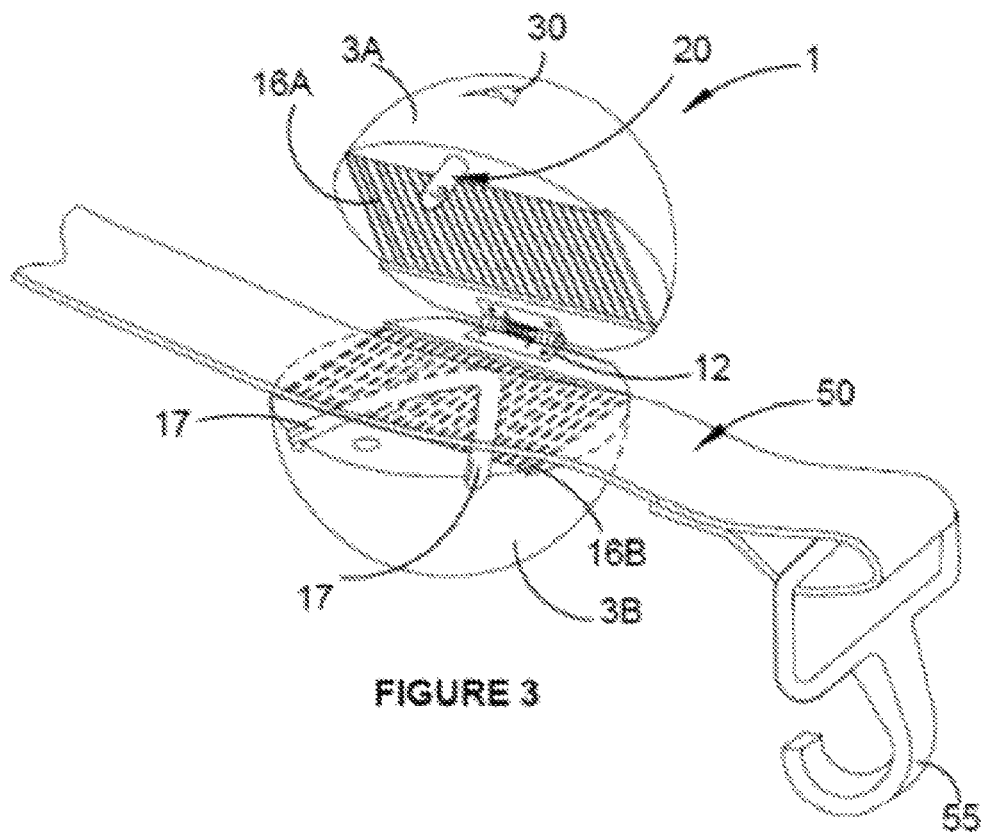
FIGS. 3 and 4 depict securing of the attachment of the first embodiment to a strap.
Figure 4:
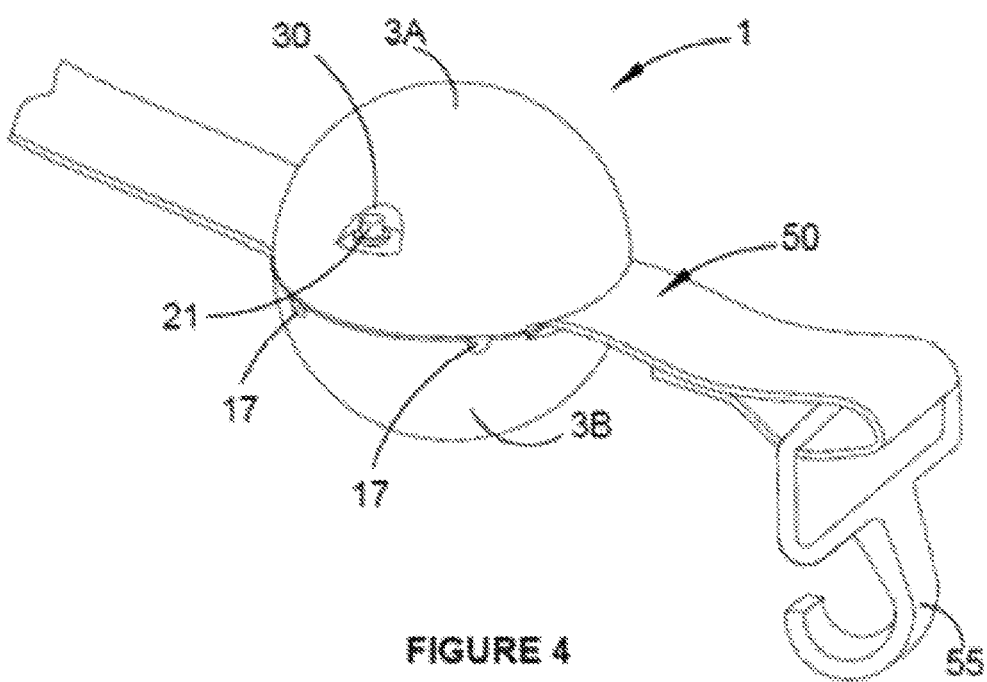
Figure 7A:
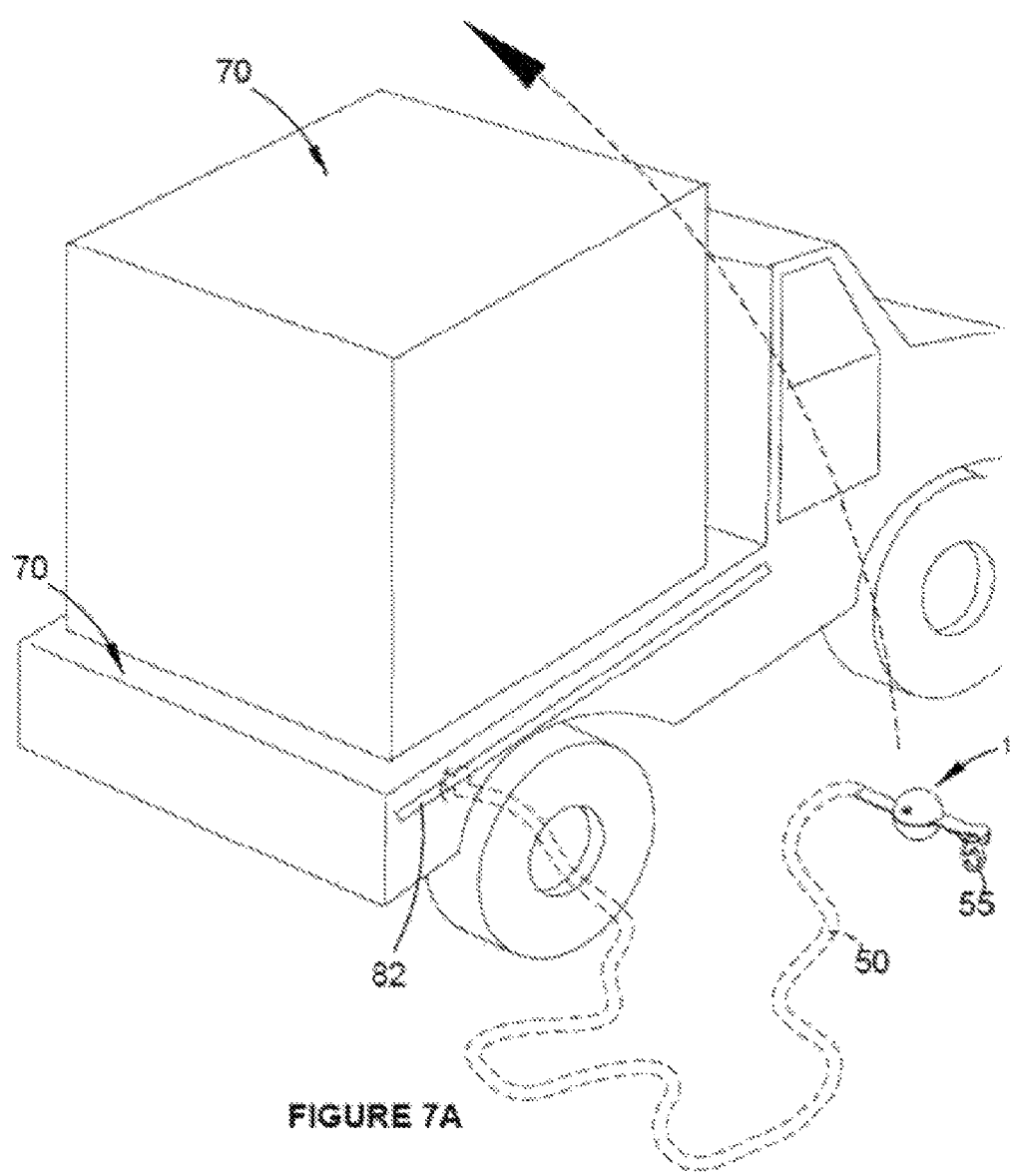
FIGS. 7A and 7B depict use of the attachment of the first embodiment to facilitate securing of a load with the strap.
Figure 7B:
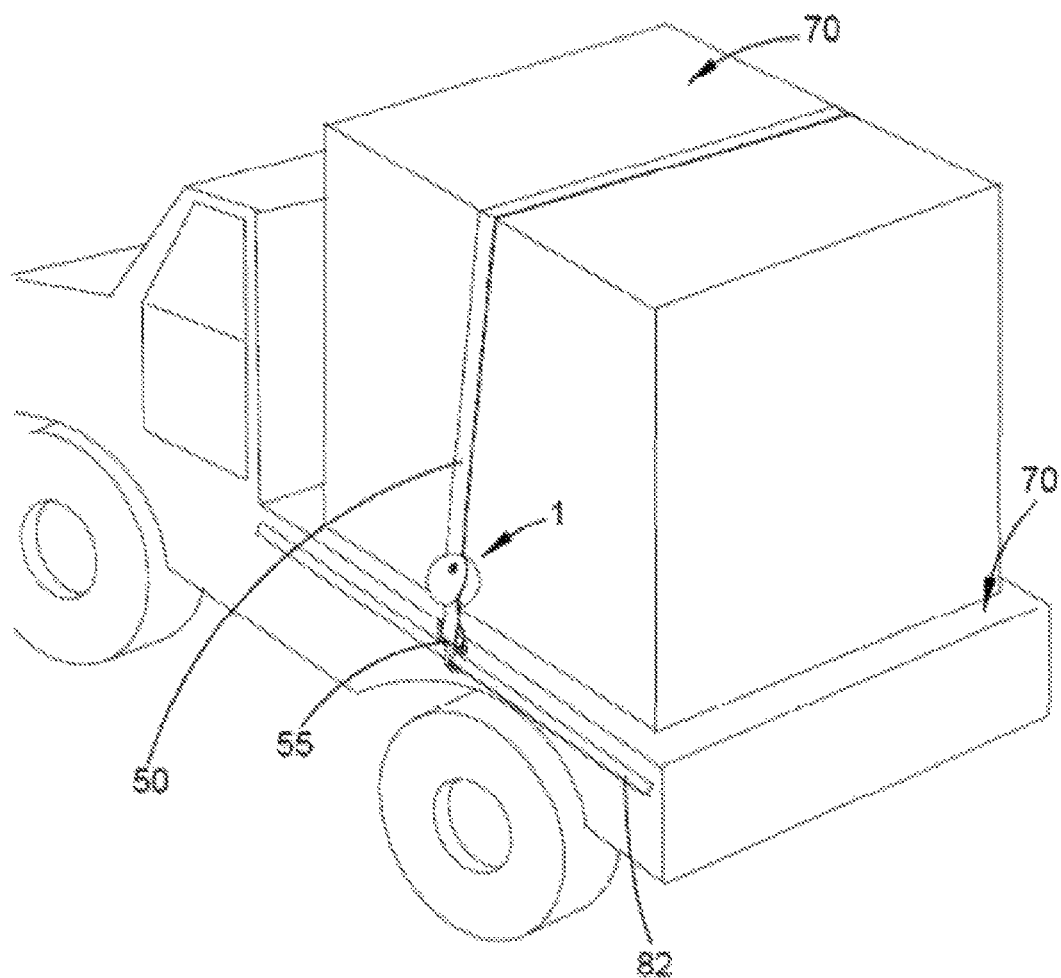

Referring to FIGS. 3 and 4, the attachment 1 is designed to clamp to a free end of a strap 50 so as to provide weight to that end and facilitate throwing of the end over a load to effect receipt of the strap 50 around the load to tie it down (see FIGS. 7A and 7B). So that the attachment 1 will reliably grip the strap 50, the sections 3A, 3B are provided with opposing gripping portions 16A, 16B respectively which, when the attachment 3 is closed over strap 50, engage the strap 50 and preclude movement of the attachment 1 along the strap 50. In the present embodiment, the gripping portions 16A, 16B comprise opposed serrations which interengage when the attachment 1 is closed so as to bite the strap 50, the serrations extending perpendicular to the pivot axis of the hinge 12. In another embodiment, the gripping portions may differ; for example, they may comprise generally flat but coarse opposing surfaces, so as to have sandpaper-like finishes and thus be frictionally engageable with the strap 50. The gripping portions may be defined by separate elements (e.g. metal plate elements) which are attached to the sections 3A, 3B or may instead be integral parts of those sections and formed when the sections are moulded.

Figure 8A:
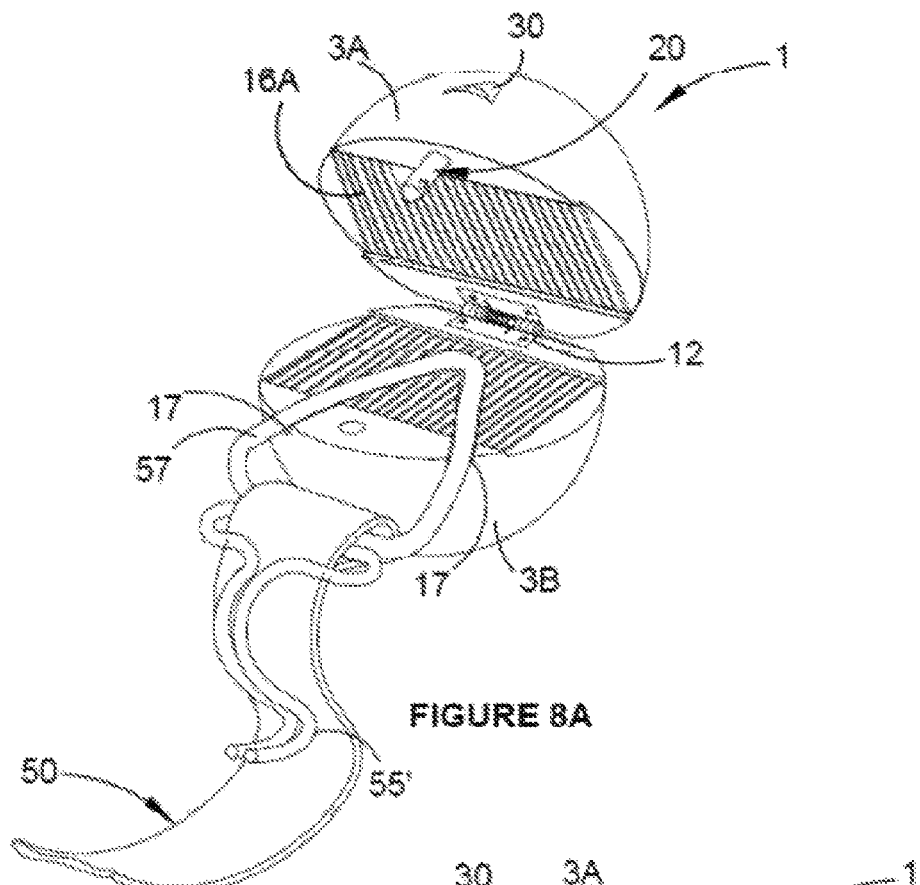
FIGS. 8A and 8B depict securing of the attachment of the first embodiment to a connector coupled to the strap.
Figure 8B:
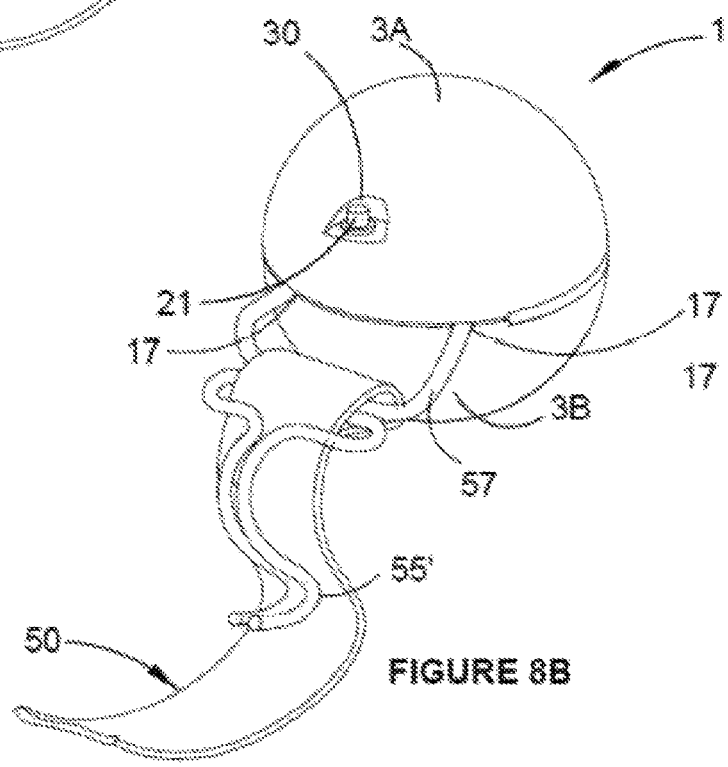

Referring to FIGS. 3, 8A and 8B, the attachment 1 is also designed so as instead to hold a metal triangular eye 57 coupled to the strap free end. For this purpose, the portion 3B is formed with a notch 17 which is v-shaped so as to have a profile complementary to a leading portion of the eye 57, whereby that portion fits snugly in the notch 17, such that, when the attachment 1 is then closed (in the aforementioned manner), the eye 57 and attachment 1 are interlocked. The notch 17 may be sufficiently shallow that the eye 57 is clamped between the portions 3A and 3B when the attachment 1 is closed. Alternatively, the notch 17 may be sufficiently deep that, when the attachment 1 is closed, it does not clamp the eye 57 but nevertheless engages it in the manner of a clasp.

Figure 5:
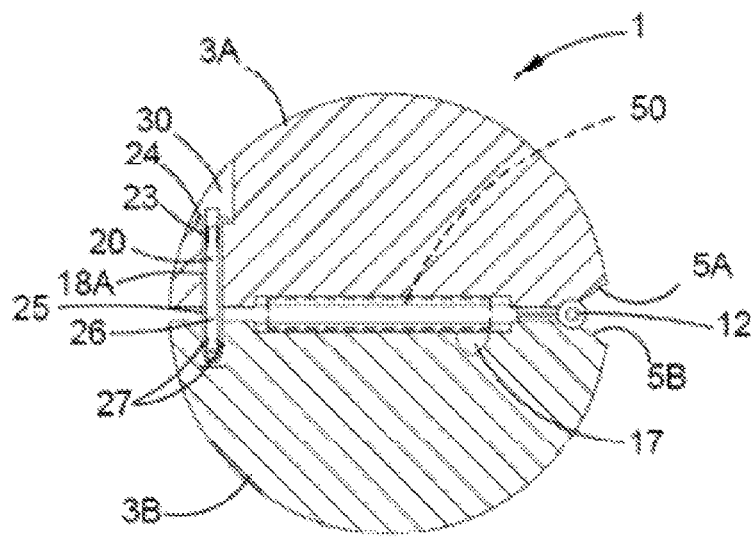
FIG. 5 is a cross-sectional view showing the attachment of the first embodiment secured to the strap.
Figure 6A:
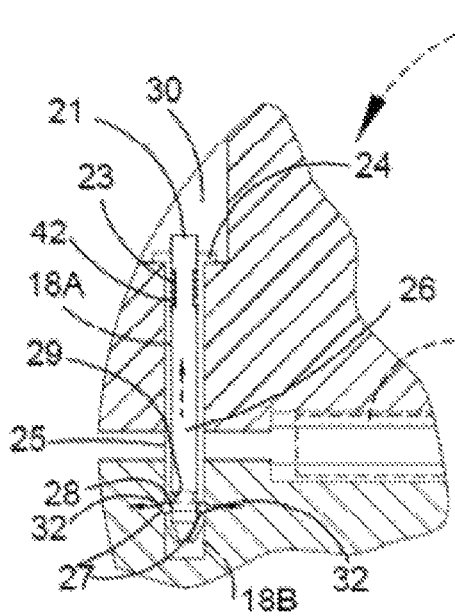
FIGS. 6A and 6B show the operation of a fastener of the attachment to lock the attachment of the first embodiment in the closed condition and release it from that condition.
Figure 6B:
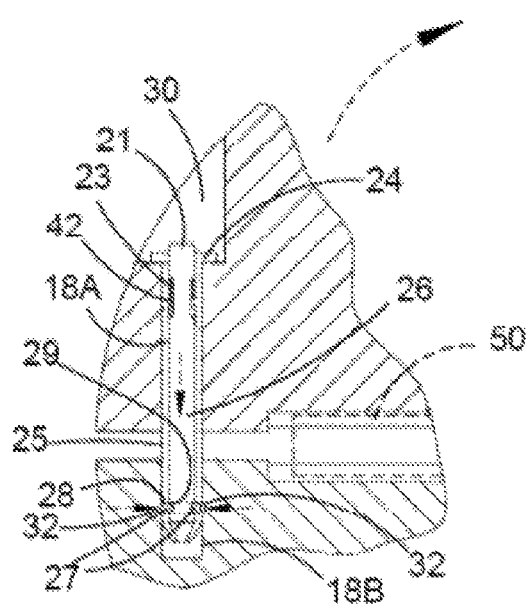

The attachment 1 further includes a locking pin 20 for holding the body 3 closed. Referring in particular to FIGS. 5, 6A and 6B, the pin 20 extends through a passage 18A formed through a distal end of the section 3A such that a leading end 22 thereof projects from the section 3A, perpendicular to the gripping portion 16A, to be receivable in a passage 18B formed in the section 3B when the sections 3A and 3B are brought together. The pin 20 comprises a head 24 at a trailing end thereof, which is contained within a cavity 30 formed into the exterior of the section 3A so as to be recessed relative to the curved surface of the section 3A and thus shielded from impact against any object when the attachment 1 has been thrown. The head 24 is sized so as to preclude the trailing end from being drawn through the passage 18A. The pin 20 comprises a sleeve 25, a shaft or plunger 26 received in the sleeve, and ball bearings 27 received by the sleeve 25 and positioned adjacent respective circumferentially spaced apart openings 28 formed through a wall of the sleeve at the pin leading end. The shaft 26 is moveable in the sleeve 25 between a first position, shown in FIG. 6A, in which it urges the ball bearings radially outwardly such that portions thereof project from the sleeve wall, and a second position, shown in FIG. 6B, in which a circumferential groove 29 in the shaft 26 is brought into alignment with the openings 28 so as to be able to receive radially inner portions of the ball bearings 27 and thus permitting retraction of the ball bearings 27 such that they are fully contained in the sleeve 25. The pin 20 incorporates a spring 23 which biases the shaft to its first position. The spring 23 is received in an annular recess defined between a narrowed section 44 of the shaft 26 and the circumferential wall of the sleeve 25 and is compressed between an underside of a trailing end 21 of the shaft and an annular shoulder 42 which projects radially inwardly from the sleeve circumferential wall. The shoulder 42 is arranged to abut a corresponding shoulder formed on the shaft 26 at a lower end of the narrowed section 44 when the shaft 26 is in its first position, thereby retaining the shaft 26 in the sleeve 25. The trailing end 21 of the shaft 26 projects axially from the head to be finger- or thumb-depressible, against the spring bias, for moving the shaft into its second position.

A circumferential groove 32 is formed into the wall of the passage 18B and arranged to receive radially outer portions of the ball bearings 27 when the body 3 is closed and the pin 20 is received by the passages 18A and 18B with the shaft in its first position, thereby locking the pin leading end to the section 3B such that the body is held closed against the bias of the spring 14.

Alternative uses of the attachment 1 in securing a load for transportation by a vehicle will now be described.

In one mode of use, referring to FIG. 3, the attachment 1 in the open condition is introduced sideways over the strap 50 at a free end thereof. Advantageously, owing to the attachment's being sideways introducible over the strap 50, its being coupled to the strap 50 is not obstructed by a hook 55 or other fitting attached at the tip of the strap. With the shaft pressed into its second position by a finger or thumb, the sections 3A and 3B are then pushed, against the bias of the spring 14, such that the gripping portions 16A, 16B clamp against the opposed faces of the strap 50 and the leading end of the pin 20 is received into the passage 18B. The finger or thumb pressure against the shaft trailing end is then discontinued, whereupon the shaft reverts to its first position, so as to urge the ball bearings 27 radially outwardly and effect receipt of the radially outer portions thereof in the circumferential groove 32 and thus interlocking between the pin 20 and section 3B. Referring to FIGS. 7A and 7B, the attachment 1, thus now securely fixed to the strap 50 can then be used to introduce the strap 50 over a load 70 supported on a bed 80 of a vehicle. Specifically, a person standing at one lateral side of the bed 80 throws the attachment 1 over the load 70 such that it carries or draws the strap 50 over and around the top of the load 70. Preferably, the end of the strap 50 which is opposite to that at which the attachment 1 is secured is coupled to the side of the bed 80 at which the person stands, e.g. by being wrapped around a rail 82 at that side and/or via another hook 55/other fitting, before the person throws the attachment 1 over the load 70, whereby that opposite end is anchored and reliably precluded from being carried over the load 70 when the attachment 1 is thrown. The end of the strap 50 at which the fitting 1 is attached can then be coupled to the bed at the opposite side thereof, e.g. by attaching the hook 55 at that end to a rail 82 at the opposite side. If appropriate, the strap 50 may then be tensioned, e.g. by means of a ratchet device (not shown) applied to the strap 50 (e.g. defining the aforementioned "other fitting"), as known to a person skilled in the art.

In the other mode of use, referring to FIGS. 8A and 8B, the attachment 1 is attached to the eye 57 coupled to the strap free end. With the shaft pressed into its second position by a finger or thumb, the sections 3A and 3B are then pushed, against the bias of the spring 14, such that the portions 3A and 3B clamp or clasp the eye 57, as previously described, and the leading end of the pin 20 is received into the passage 18B. The finger or thumb pressure against the shaft trailing end is then discontinued, in the manner previously described, whereby the interlock between the pin 20 and section 3B, and thus closure of the attachment 1 over the eye 57, is effected. The attachment 1, thus secured to the eye 57, can then be thrown to introduce the strap 50 over the load 70 in substantially the same manner as shown in FIG. 7A, and thereafter removed from the eye 57 whereby the eye 57 can, if appropriate, be used to anchor the strap end. Advantageously, owing to much of the eye 57 being enclosed by the attachment 1 when it is attached thereto, the attachment 1 can serve as a protective shield whereby objects struck as a result of the throwing the attachment 1/strap end are impacted by the attachment 1, which is relatively soft, instead of by the eye 57, which is hard. Also advantageous is that, in this mode of use, the attachment 1 is received at/over the leading end of the assembly comprising the strap 50 and eye 57, which leading end is defined by the eye 57, whereby throwing and good carriage of the attachment 1/strap end are facilitated.

Figure 9A:
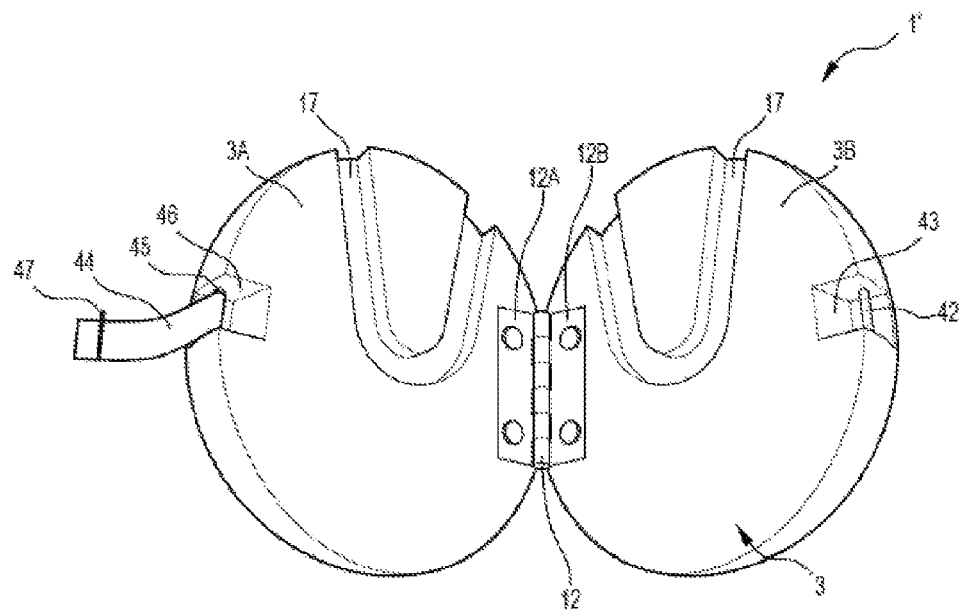
FIGS. 9A and 9B are perspective views of a weight attachment according to a second preferred embodiment of the invention.
Figure 9B:
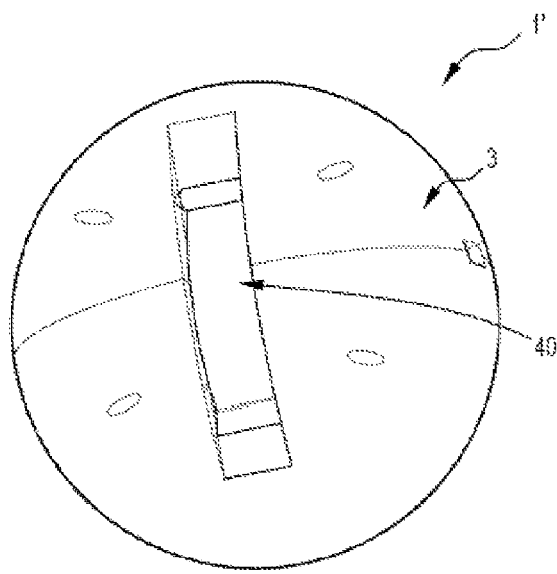

Shown in FIGS. 9A and 9B, in open and closed conditions respectively, is a weight attachment 1' according to a second preferred embodiment of the invention. In the description and figures of this embodiment, the same reference numerals as have been used in respect of the first embodiment are used to denote and refer to the same or corresponding features.

The attachment 1' according to the second embodiment is identical to the attachment 1 except with respect to the means for holding the body 3 closed and the configuration of opposed faces of the attachment 1 which mate when the attachment 1' is closed, as discussed further below.

The means for holding the attachment 1' closed comprises a clasp 40 comprising a transversely extending locking pin 42 opposite ends of which are held within the section 3B, the pin 42 extending within and traversing a cavity or recess 43 formed within the portion 3B. The clasp 40 further comprises a link 44 and a mounting pin 45 via which the link 44 is pivotally mounted to the section 3A and extends within and traverses a cavity or recess 46 formed within the section 3A, opposed ends of the pin 45 being held within the section 3A. Owing to the provision of the recesses 43, 46, the clasp 40, when closed, is countersunk with respect to the curved outer surface of the attachment 1'. The link 44 is configured with a resiliently deformable catch 47 which, when the attachment 1' is closed, can be interlockingly received over the pin 42, whereby the clamp 40 is closed and the device 1' is thus locked in its closed condition. The clasp 40 can be opened simply by pulling the distal end of the link 44 in a direction away from the pin 42, thereby effecting resilient deformation of the catch 47 and thus release of the link 44 from the pin 42.

In the attachment 1', each of the sections 3A, 3B is configured with a notch 17, the notches 17 being arranged so as to marry up to hold the eye 57 when the attachment 1' is closed.

In the present embodiment, the sections 3A, 3B are not provided with gripping portions comprising opposed serrations/corrugations or having coarse opposing surfaces, though may, without departure from the invention, do so whereby gripping of a strap 50 may be enhanced.

The attachment 1' may be attached to the strap 50 or eye 57 in the same manner as the attachment 1.

It will be appreciated that the notch(es) 17 in the embodiments described and illustrated may instead be configured to fit to an alternative fitting, such as a hook member 55 or 55', coupled to the strap end, without departure from the invention.

The hinge in each of the attachments 1 and 1' may, without departure from the invention, be replaced with an alternative hinge, such as a flexible hinge, e.g. a living hinge or a hinge which is defined by a section of strap which is secured to the first and second sections, e.g. against outer faces thereof via screws, and/or which may be inset.

Shown in FIGS. 10 and 11A to 11E is a weight attachment 1" according to a third preferred embodiment of the present invention. In the description and figures of this embodiment, the same reference numerals as have been used in respect of the first embodiment are used to denote and refer to the same or corresponding features.

Figure 10:
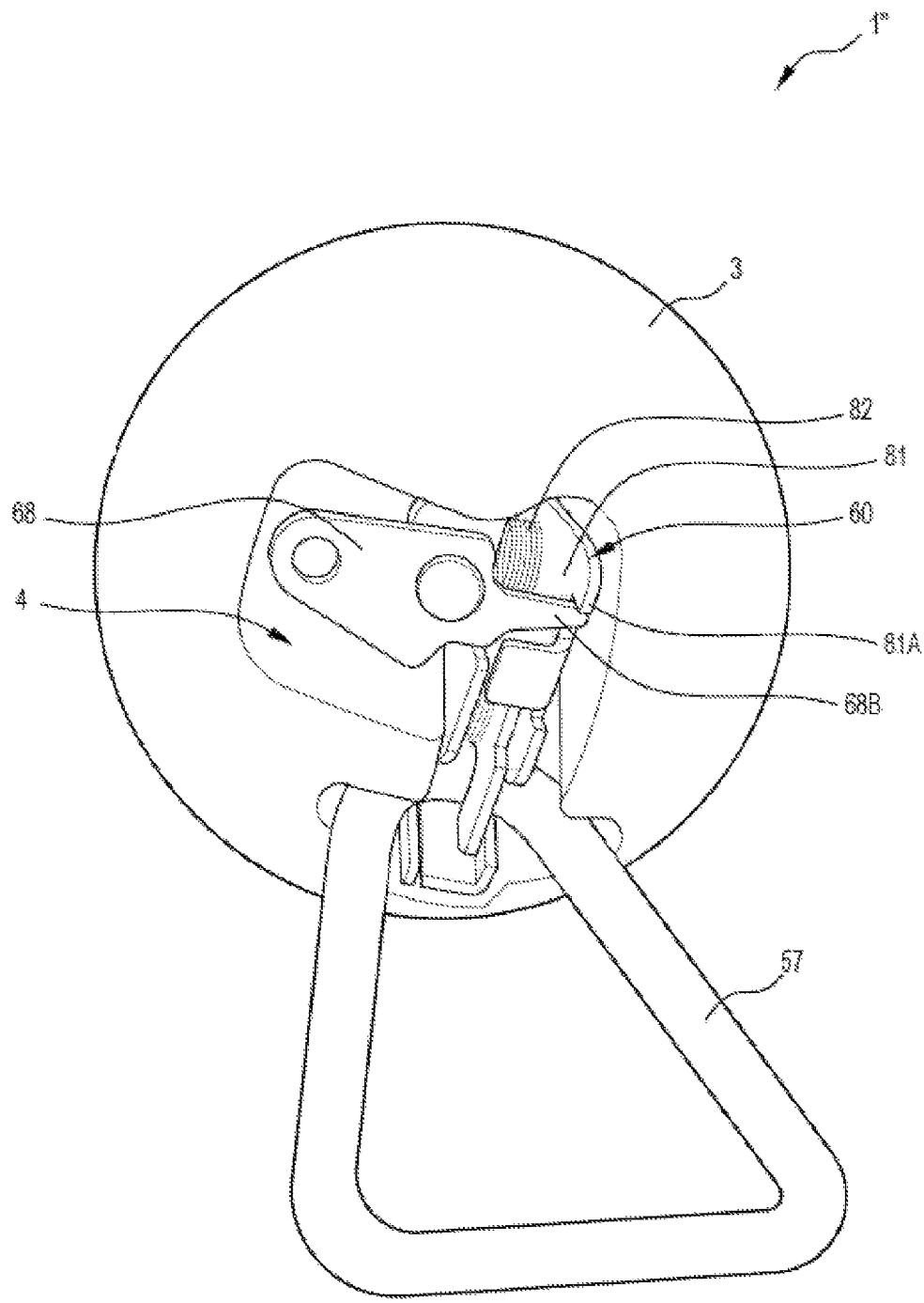
FIG. 10 is a perspective view of a weight attachment according to a third preferred embodiment of the invention and a tie-down strap connector with which a manually releasable snap-fit locking mechanism of the attachment is engaged.

The attachment 1", like each of the attachments 1 and 1', comprises a generally spherical semi-hardened rubber body 3. The body 3 in this embodiment, however, does not comprise pivotally interconnected hemispherical sections; rather, it is of single-piece, "unopenable", construction. The attachment 1", like each of the attachments 1 and 1', is removably attachable to the triangular eye 57, the latter when in use being coupled to the free end of the strap 50 as shown in FIGS. 8A and 8B, so as to provide weight to that end to facilitate throwing of the end over a load, whereby to effect receipt of the strap 50 around the load to tie it down in a manner consistent with what is shown at FIGS. 7A and 7B. The attachment 1" includes a locking mechanism, in the form of a conventional rotary latch mechanism 60, which is a well-known component, that is anchored within the body 3 and arranged within a recess 4 formed in the body 3, so as to be countersunk in the body 3, whereby it does not upset the aerodynamics of the attachment 1" and is shielded from impact against objects when the attachment 1" has been thrown. As will be clear from FIG. 10, the rotary latch mechanism 60 is engageable with the leading end of the eye 57 when the latter is inserted in the recess 4. The mechanism 60, referring to FIGS. 11A and 11B (which show the mechanism 60 in a closed condition, and not in engagement with the eye 57), comprises a bracket 61, which is anchored within the body 3 so as to be fixed relative thereto, the bracket 61 having opposed sidewalls 62 configured with transversely aligned radially outwardly opening slots 63, and a latch, defined by an element 64, arranged between the sidewalls 62 and pivotally attached to them. A distal end of the element 64 is configured with spaced apart projections 65 which define a slot 66 that opens radially outwardly with respect to the pivot axis of the element 64, the outermost one of the projections 65 being configured with a curved distal end 65A. As can best be seen at FIG. 11B, when the mechanism 60 is in a closed condition, the slot 66 is arranged between and in alignment with the slots 63. The mechanism 60 includes a torsional spring 67 comprising a helical coil one end of which is fixed relative to the bracket 61 and the other end of which is fixed relative to the element 64, the spring 67 being arranged to bias the element towards the open position shown in FIG. 11C. The mechanism 60 further comprises a trip lever 81, arranged between the sidewalls 62 and pivotally attached to them, and a torsional spring 82 comprising a helical coil one end of which is fixed relative to the bracket 61 and the other end of which is fixed relative to the element lever 81 such that, when the lever 81 is pivoted in either rotational direction from the position shown in FIG. 11B, the spring 82 exerts on lever 81 a biasing torque towards that position. A portion (not shown) of the lever 81 which is forward of that lever's pivot point is configured to engage catch (not shown) formed a portion of the element 64 which is rearward of that element's pivot point, such that the lever 81 locks the element 64 in the closed position shown in FIG. 11B. The mechanism 60 further comprises a lever 68 which is pivotally connected, via a fastener 69, to the bracket 61, the lever 68 comprising a thumb-engageable portion 68A, which projects radially outwardly from the rotational axis of the lever 68, and a projection 68B, which projects radially outwardly from that axis in the opposite direction so as to abut a projection or tab 81A formed on the trip lever 81 at a position which is rearward of that lever's pivot point, such that application of thumb pressure to the portion 68A, in the direction of arrow A shown in FIG. 11B, induces pivoting of the lever 81, against torsional resistance offered by the spring 82, into the position shown in FIG. 11C, whereby the aforementioned portion of the lever 81 is disengaged from the catch of the element 64 and the element thus pivots into its open position, the mechanism 60 thus assuming an open condition. The bracket 62 is configured with a stopper 62A, in the form of a tab integrally formed with one of the sidewalls 62, which is arranged to abut the element 64 so as to preclude pivoting thereof beyond the position shown in FIG. 11C. The recess 4, as will be clear from FIG. 10, is sufficiently large to permit thumb access for the purposes of operating the lever 68. The element 64 can be returned to its closed position by pressing the forward end thereof towards the body 3 (either by hand or with the leading end of the eye 57, if the latter is being brought into engagement with the mechanism 64 when open), whereby the element pivots back to its closed position, the rearward portion of the element 64, as that element does so, riding over the forward portion of the lever 81 and in so doing pivotally displacing it, whereby the lever 81 reverts to the position shown in FIG. 11B and engagement between the forward portion of the lever 81 and the catch is re-established.

To effect interengagement of the eye 57 and mechanism 60 when the latter is closed, a person inserts the eye leading end into the recess 4 such that it abuts the outermost projection 65, thereby causing the element 64 to pivot, out of engagement with the trip lever 81 (which remains in the position shown in FIG. 11B) and against torsional resistance offered by the spring 67, whereby the projections 65 are rotationally displaced further into the body 3 and the eye leading end is received in the slots 63. Upon the element 64 being rotationally displaced to a sufficient degree, the tip of the eye leading end slides, over the curved end 65A, past that end, whereupon the resilient bias returns the element 64 to the position shown in FIG. 11B and the tip is received in the slot 66. The mechanism 60 is thus snap-fit engageable with the eye 57.

The slot is dimensioned such that the resulting fit formed between the tip and slot 66 is snug. The eye 57 and attachment 1" are thus interconnected, as shown in FIG. 10. To release the eye 57 from the attachment 1", the mechanism 60 is placed into its open condition, in the manner previously described with reference to FIGS. 11B and 11C, permitting the eye 57 to be withdrawn from the element 64.

The mechanism 60 is a rotary latch having model no. R4-10-32-101-10 and produced by Southco. Details of the latch are at http://www.southco.com/en-us/r4-r/r4-10-10-101-10. The mechanism has right-hand actuation, as will be clear from FIGS. 11B to 11D, though may instead have left-hand actuation if the user of the attachment is left-handed, rather than right-handed.

The locking mechanism may comprise a different type of rotary latch, or something other than a rotary latch, without departure from the invention.

Figure 11A:
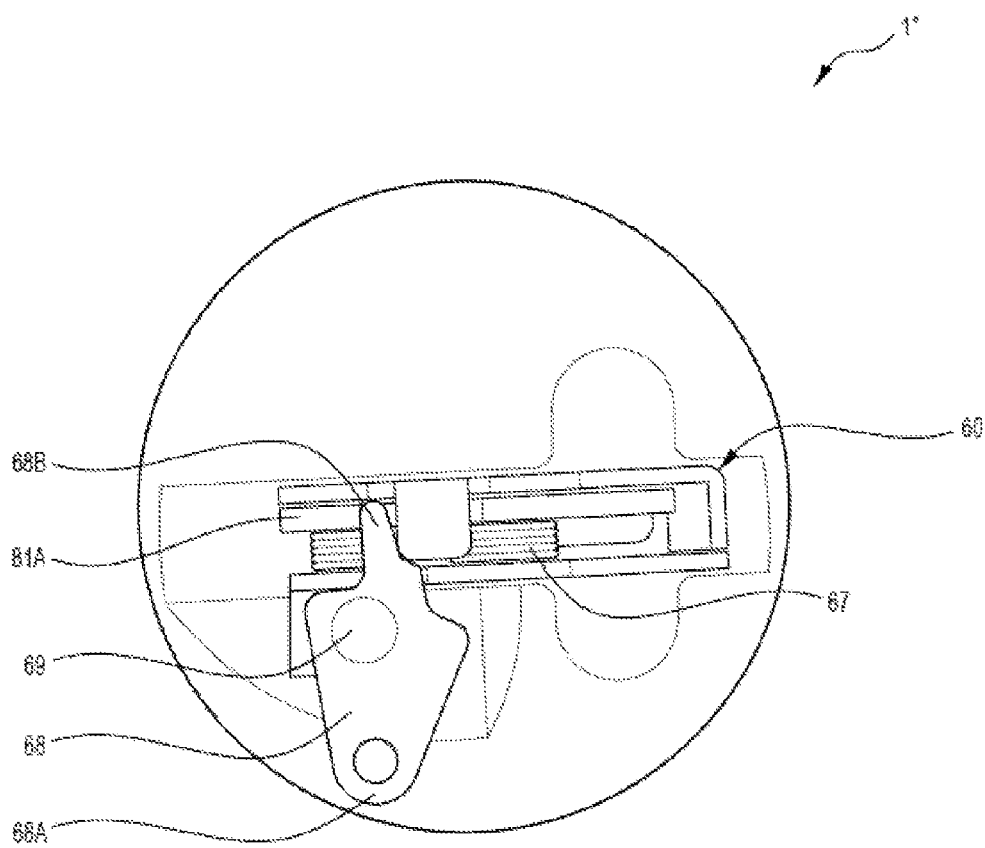
FIG. 11A is a top view of the attachment of the third embodiment.
Figure 11B:
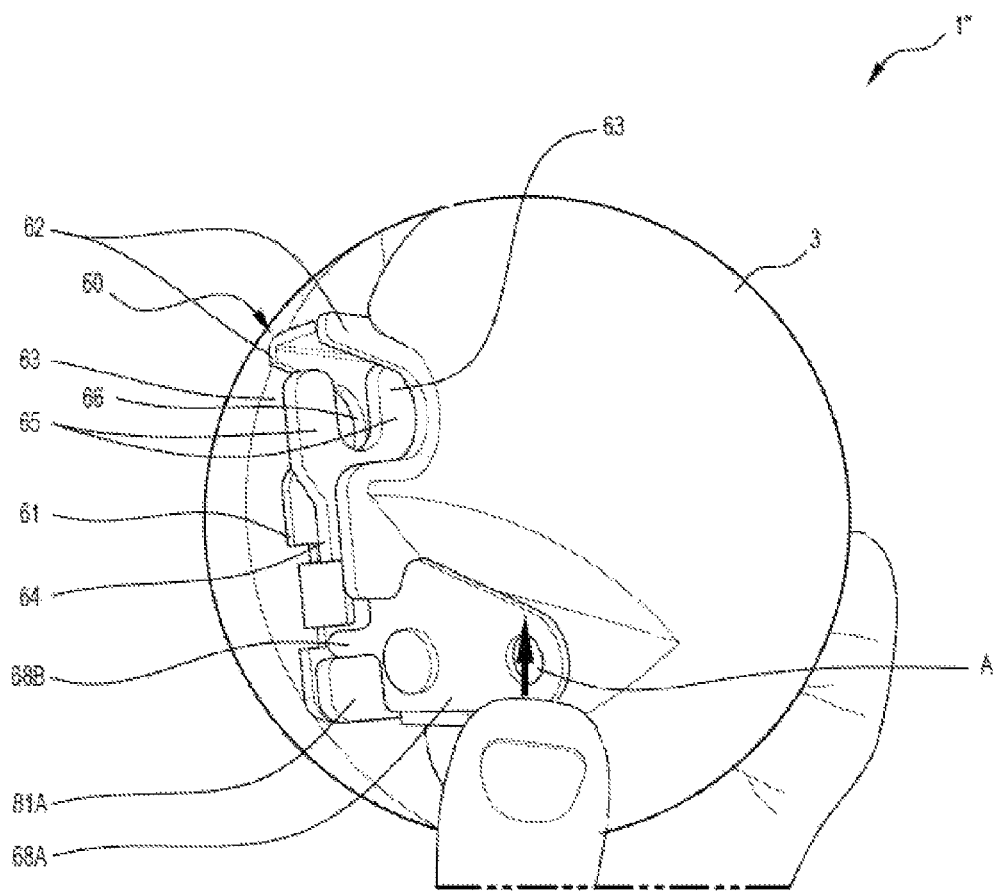
FIG. 11B is a cutaway side perspective view of the attachment of the third embodiment, showing the locking mechanism thereof in a closed condition
Figure 11C:
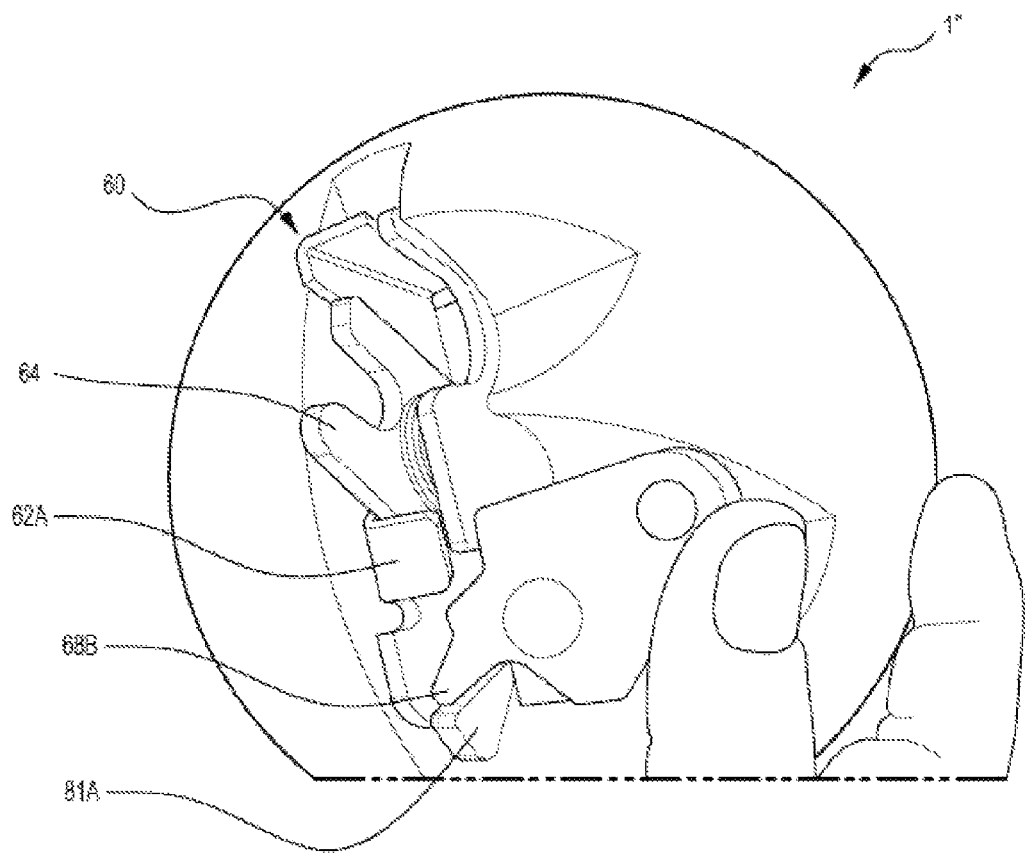
FIG. 11C is a first cutaway perspective view showing details of the attachment of the third embodiment, depicting the locking mechanism thereof in an open condition.
Figure 11D:
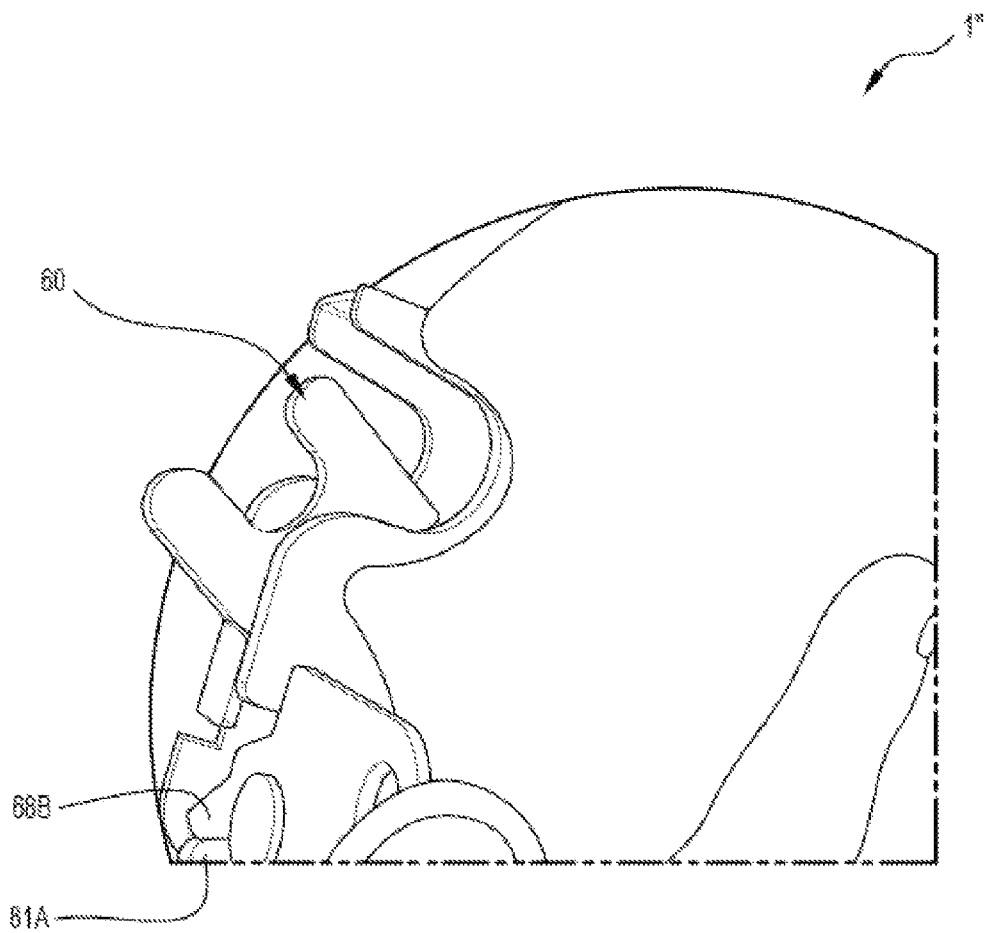
FIG. 11D is a second cutaway perspective view showing details of the attachment of the third embodiment, depicting the locking mechanism thereof in the open condition.
Figure 11E:
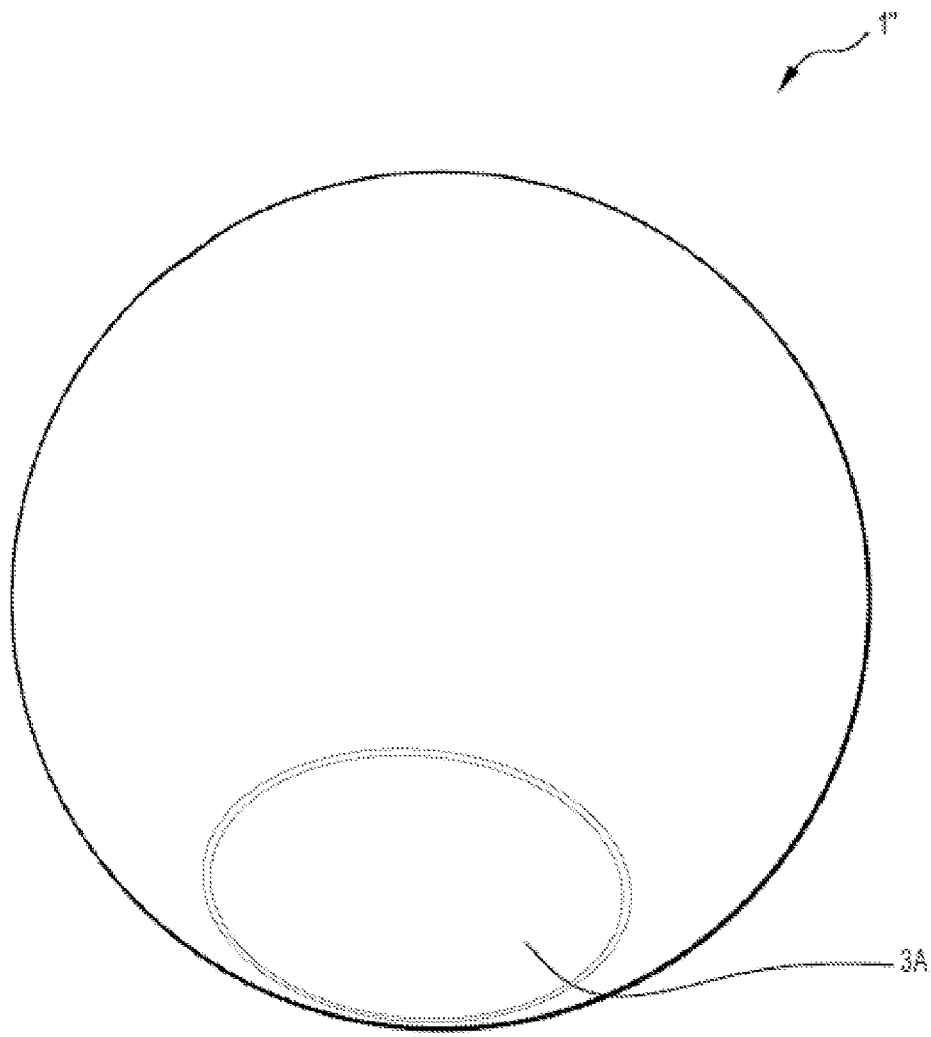
FIG. 11E is a bottom perspective view of the attachment of the third embodiment.

Referring to FIG. 11E, the body 3 is configured with a seat portion 3A, comprising a flattened area, at a side thereof opposite said mechanism 60, the seat portion being receivable against a surface whereby the attachment 1" is stably supported on the surface in a position such that mechanism 60 is uppermost.

The attachment 1" may, without departure from the invention, be modified such that, when the eye 57 is engaged therewith, the plane in which the triangle defined by the eye lies passes through the centre of mass of the body 3 or attachment 1", which centre of mass is substantially coincident with the geometrical centre of the sphere defined by the body 3, and the locking mechanism is anchored to the body 3 in a manner permitting the body 3 to swivel relative to the locking mechanism 60 about an axis lying within the plane and passing through the aforementioned centre of mass/geometrical centre. As a result, rotation about that axis, imparted to the attachment 1" at the the time it is thrown, will not be, in turn, imparted to the eye 57, whereby twisting of the strap 50 as it is carried over the load by the attachment 11", is restricted or eliminated.

Each of the attachments 1, 1' and 1" is of a weight which is sufficiently low to permit it to be thrown over the load 70 yet sufficiently high to provide enough mass at the strap end to carry it reliably over the load, particularly in windy conditions which would otherwise hinder the strap end from being so carried under its own weight. Each of the attachments 1, 1' and 1", in being spherical (at least when in situ) is aerodynamic and, in comprising a rubber body is sufficiently soft such that a risk of damage to the vehicle or another object, as a result of its being thrown, is reduced or eliminated.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

What is claimed:

1. An attachment for facilitating extension of a pliable or flexible line such that a free end of the line can be tightly anchored, to tie a load for transportation by a vehicle, the attachment being attachable to the free end so that it can be thrown by a person to carry the end whereby said extension is effected, the attachment being attachable to a connector or fitting attached or coupled to the end and comprising:
    a body that is non-rigid so as to be deformable when impacting with an object upon said extension being effected; and
    a releasable locking mechanism arranged to engage the connector or fitting such that the attachment is removably attached to the line via the connector or fitting, wherein the mechanism is countersunk in the body so as to be shielded from impact against objects when the attachment has been thrown and is configured to assume a closed condition to hold the attachment to the connector or fitting, and to assume an open condition to permit release of the connector or fitting from the attachment.

2. An attachment according to claim 1, wherein the body is generally ball-shaped.

3. An attachment according to claim 1, wherein the body is generally spherical.

4. An attachment according to claim 1, wherein the body is formed from an elastomer.

5. An attachment according to claim 1, being directly attachable to an eye or hook defined by the connector or fitting.

6. An attachment according to claim 1, wherein said mechanism comprises an actuator operable by finger or thumb to effect disengagement of the mechanism from said connector or fitting.

7. An attachment according to claim 6, wherein the actuator comprises a lever.

8. An attachment according to claim 1, configured such that the mechanism is snap-fit or snap-lock engageable with said connector or fitting such that the attachment is attached to the line via the connector or fitting.

9. An attachment according to claim 8, configured such that the snap-fit/lock engagement can be effected by pushing the connector/fitting against the mechanism.

10. An attachment according to claim 1, wherein said mechanism comprises a rotary latch.

11. An assembly comprising an attachment according to claim 1 and said line, wherein said mechanism engages said connector or fitting such that the attachment is removably attached to the fitting or connector.

12. A method of positioning a pliable or flexible line such that said line extends over at least one object, the method comprising bringing the mechanism of an attachment according to claim 1 into engagement with a said connector or fitting attached or coupled to a free end of the line such that the attachment is attached to the line via the connector or fitting, and then throwing the attachment such that it carries a section of the line over the objects, whereby said positioning is effected.

13. A method of casting a pliable or flexible line, the method comprising throwing an attachment according to claim 1, wherein the mechanism of the attachment is in engagement with the connector or fitting attached or coupled to a free end of the line such that the attachment is attached to the fitting or connector.

14. A method of securing at least one object against a support, comprising:
    (a) bringing a locking or connecting mechanism of an attachment into engagement with a connector or fitting attached or coupled to a free end of a pliable or flexible line, such that the attachment is removably attached to the fitting or connector and thus attached to the free end via the fitting or connector, and can be thrown so as to carry the end over the at least one object, the attachment comprising a body to which the mechanism is connected;
    (b) throwing the attachment such that it carries a section over the at least one object, thereby positioning the line whereby it extends over the at least one object; and
    (c) effecting tight anchorage of said line such that the at least one object is secured against the support by said line.

15. A method according to claim 14, wherein said tight anchorage is effected by anchoring the line to said support.

16. A method according to claim 14, including, removal of the attachment prior to the tight anchorage being effected.

17. A method according to claim 14, wherein a load is defined by the objects, and the support comprises a structure for holding or carrying the load.

18. A method according to claim 17, wherein the structure forms part of a vehicle.

19. A method according to claim 17, wherein the structure comprises a tray or bed.

20. A method according to claim 14, wherein said section comprises said free end.

21. A method according to claim 14, wherein the line is configured in the form of a belt or strap.

\* \* \* \* \*